(12) United States Patent
Lin

(10) Patent No.: US 6,205,258 B1
(45) Date of Patent: Mar. 20, 2001

(54) IMAGE SCANNER HAVING BRIGHTNESS COMPENSATION FUNCTION VIA OUTPUT ADJUSTMENT

(75) Inventor: John Lin, Hsin-Chu (TW)

(73) Assignee: Must Systems, Inc. (TW)

( * ) Notice: Subject to any disclaimer, the term of this patent is extended or adjusted under 35 U.S.C. 154(b) by 0 days.

(21) Appl. No.: 09/073,506

(22) Filed: May 6, 1998

Related U.S. Application Data

(63) Continuation of application No. 08/636,377, filed on Apr. 23, 1996, now abandoned.

(51) Int. Cl.[7] ............... G06K 9/40; H04N 1/00; H04N 1/40
(52) U.S. Cl. ............ 382/274; 358/406; 358/447
(58) Field of Search .................. 358/406, 443, 358/461, 463, 464, 520, 504, 513, 447, 468, 483; 382/274; 348/246, 251; H04N 1/00, 1/04

(56) References Cited

U.S. PATENT DOCUMENTS

| | | | | |
|---|---|---|---|---|
| 4,524,388 | * | 6/1985 | Abe et al. | 358/461 |
| 4,974,098 | * | 11/1990 | Miyaka et al. | 358/461 |
| 5,003,618 | * | 3/1991 | Meno | 382/54 |
| 5,099,341 | * | 3/1992 | Nosaki et al. | 358/461 |
| 5,249,068 | * | 9/1993 | Takase | 358/461 |
| 5,278,674 | * | 1/1994 | Webb et al. | 358/475 |
| 5,402,249 | * | 3/1995 | Koskki et al. | 358/443 |
| 5,640,381 | * | 6/1997 | Call et al. | 369/116 |

FOREIGN PATENT DOCUMENTS

353124022A * 10/1978 (JP) .

* cited by examiner

Primary Examiner—Madeleine Nguyen
(74) Attorney, Agent, or Firm—Madson & Metcalf

(57) ABSTRACT

A cost effective and easily assemblable image scanning device with a relatively stable and satisfactory scanning effect is disclosed. The present image scanning device is used in an image scanner having a light source and a focusing reflector device. The image scanner device includes a brightness reflection device for generating a brightness reflection signal in response to a light signal from the light source; an image sense device for respectively generating an image sense signal and a reference brightness signal in response to an object reflection signal from the object to be scanned and the brightness reflection signal; and a brightness-controlling device electrically connected to the image sense device for compensating the image sense signal in response to the reference brightness signal.

14 Claims, 6 Drawing Sheets

| optical line | color scale quality | reference brightness signal | image sense signal | | | | | |
|---|---|---|---|---|---|---|---|---|
| 1st | | 202 | 105 | 153 | 200 | . . . | . . . | . . . |
| 2nd | | 203 | 106 | 154 | 201 | . . . | . . . | . . . |
| 3rd | | 204 | 108 | 156 | 203 | . . . | . . . | . . . |
| . . . . . . . . . . . . | | | | | . . . . . . . . . . . . | | | |
| 1113th | | 253 | 156 | 204 | 251 | . . . | . . . | . . . |
| 1114th | | 255 | 158 | 206 | 253 | . . . | . . . | . . . |

Fig. 6

IMAGE SCANNER HAVING BRIGHTNESS COMPENSATION FUNCTION VIA OUTPUT ADJUSTMENT

This application is continuation of Ser. No. 08/636,377 Apr. 23, 1996, now abandoned.

FIELD OF THE INVENTION

The invention relates to an image scanning device, and more particularly to an image scanning device which does not need a warming-up before use. It will be recognized that the present invention has a wider range of applicability. Merely by way of example, the invention may be applied in photocopy system, among others.

BACKGROUND OF THE INVENTION

Industry utilizes or has proposed various image scanners in different applications and fields. The light source of the conventional image scanner is usually categorized in two types: CCFT (cold cathode fluorescent tube) and fluorescent lamp. After the CCFT or the fluorescent lamp is lighted up, the brightness thereof will increase gradually to then be stable after 4 or 5 minutes. Thus it is a must to warm up the conventional image scanner several minutes to obtain a more stable scanning effect. In addition, the brightness will be decreased owing to the aging of the fluorescent lamp. In today's technology, one way to solve the above-mentioned problem is to incorporate the light fibers in the image scanner, but actually it is an expensive and inconvenient expedient.

From the above it is seen that a cost effective and easily-assemblable image scanning device with a relatively stable and satisfactory scanning effect is often desired.

SUMMARY OF THE INVENTION

One objective of the present invention is to provide an image scanning device having a relatively stable and satisfactory scanning effect.

Another objective of the present invention is to provide an image scanning device without the need of warming up before use.

Yet another objective of the present invention is to provide a cost effective image scanning device.

Still another objective of the present invention is to provide an easily-assemblable image scanning device.

In a specific embodiment, the present invention provides an image scanning device used in an image scanner having a light source and a focusing reflector means. The image scanner device includes a brightness reflection device for generating a brightness reflection signal in response to a light signal from the light source; an image sense device for respectively generating an image sense signal and a reference brightness signal in response to an object reflection signal from the object to be scanned and the brightness reflection signal; and a brightness-controlling device electrically connected to the image sense device for compensating the image sense signal in response to the reference brightness signal.

Certainly, the brightness reflection device can be located in the optical path of the light signal. The brightness reflection device can be mounted on a lens of the image scanner. The lens can be a bottom scanning window.

Certainly, the brightness reflection device can be made of light reflective material. The brightness reflection device can be a light reflective sticker. The light reflective sticker can further include a piece of white paper.

Certainly, the image sense device can be a linear image sensor.

Certainly, the brightness-controlling device can include an amplification and bias adjusting circuit electrically connected to the image sense device for amplifying and biasing the image sense signal and the reference brightness signal; a sample/hold circuit electrically connected to the amplification and bias adjusting device for receiving the amplified and biased image sense signal and reference brightness signal to sample and hold the amplified and biased image sense signal and reference brightness signal in response a clock signal; a clamping circuit electrically connected to the sample/hold circuit and the amplification and bias adjusting circuit for maintaining the image sense signal and reference brightness signal at a fixed level; and an analog/digital converter electrically connected to the clamping means for converting the image sense signal and reference brightness signal into digitized signals.

The forgoing and other objects, features, and advantages of the invention will be apparent from the following more particular description of a preferred embodiment of the invention, as illustrated in the accompanying drawings.

BRIEF DESCRIPTION OF THE DRAWING

FIG. 6 is a diagram illustrating the color scale quality of the image sense signal and the reference brightness signal according to the present invention.

DETAILED DESCRIPTION OF THE PREFERRED EMBODIMENT

Figure 1:
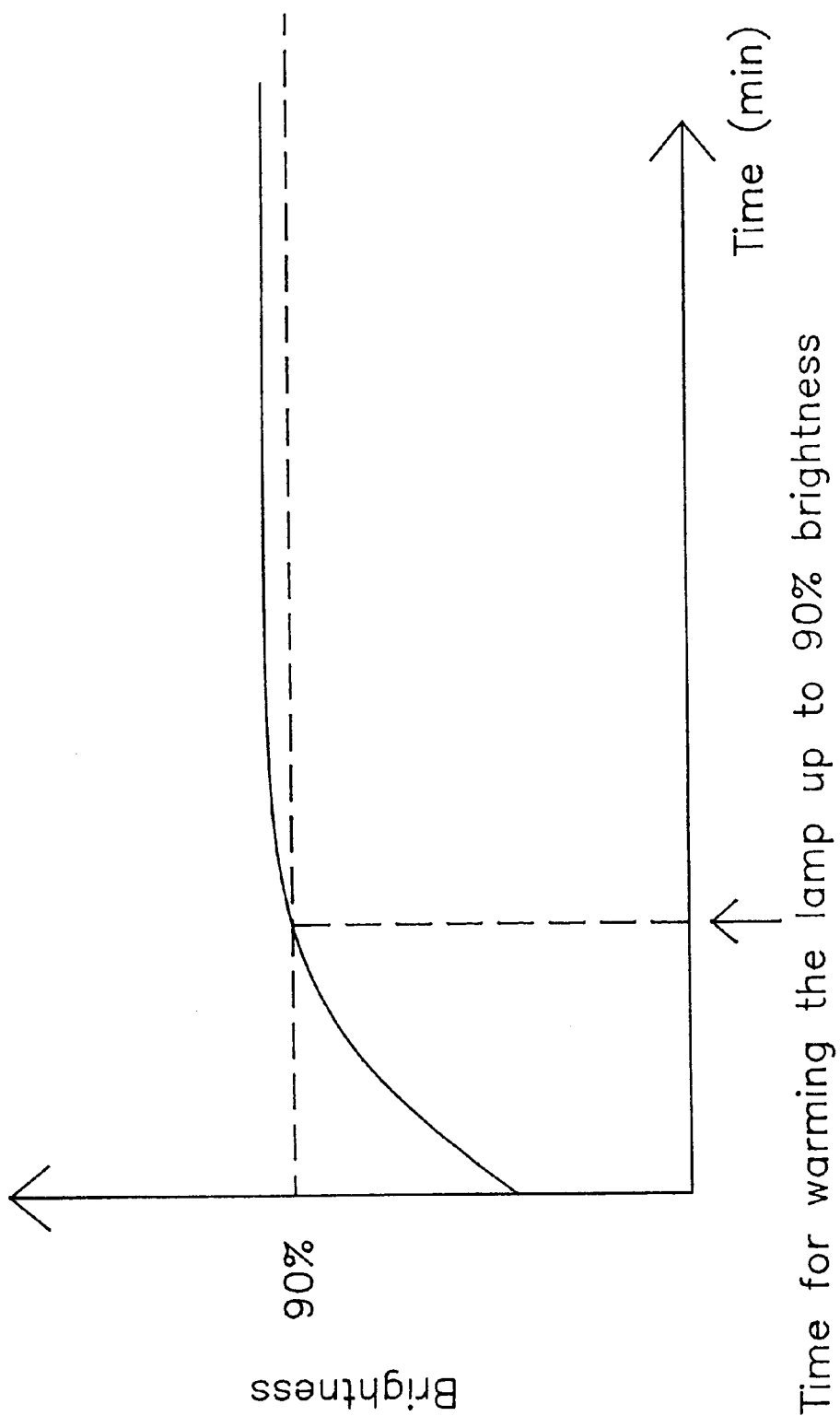
FIG. 1 shows the relation between the warm-up time of the fluorescent lamp and the brightness of the fluorescent lamp.
Figure 2:
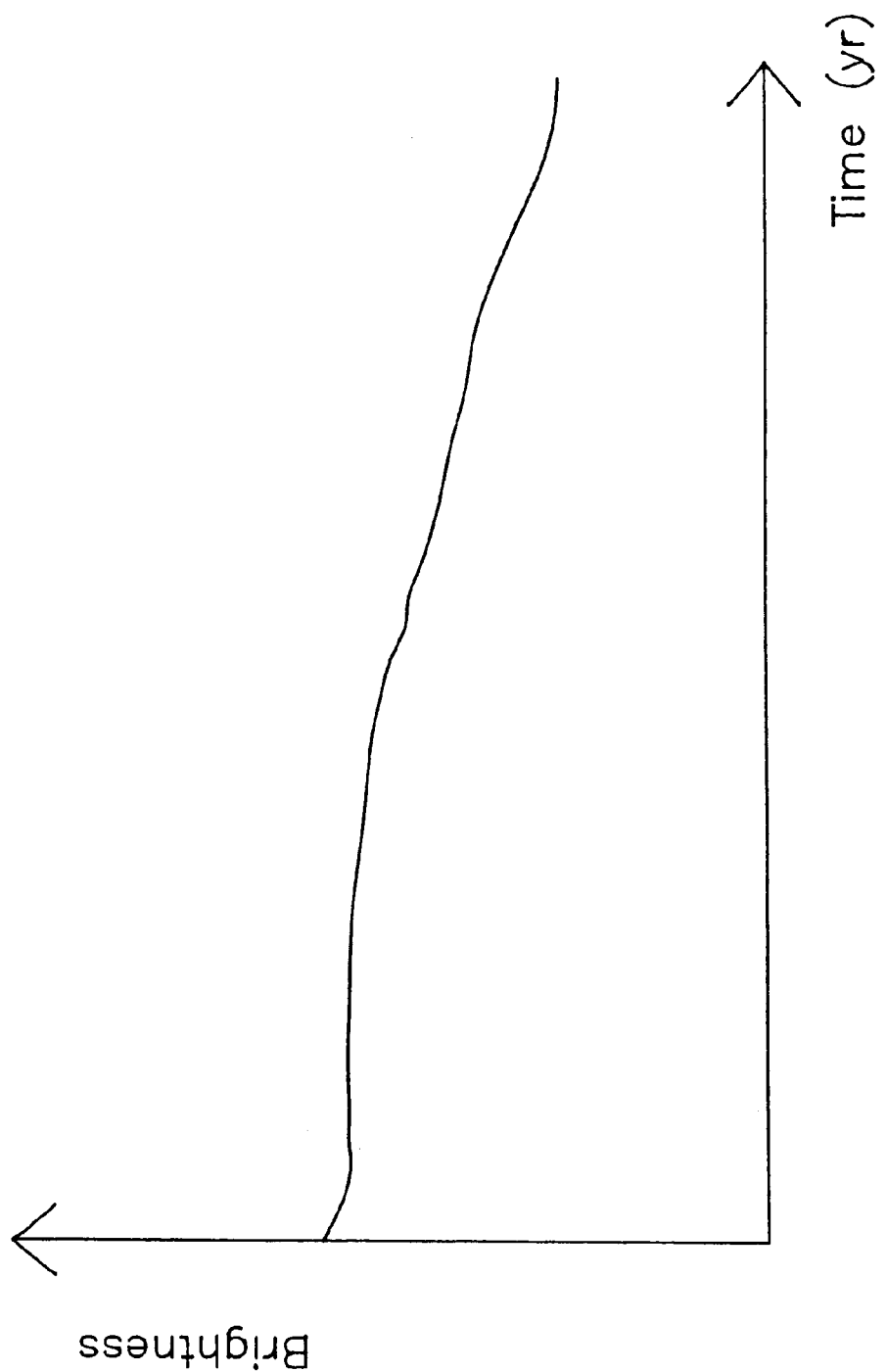
FIG. 2 shows the relation between the use time of fluorescent lamp and brightness of the fluorescent lamp.

FIG. 1 shows the relation between the warm-up time of the fluorescent lamp and the brightness of the fluorescent lamp. It can be clearly observed from FIG. 1 that the brightness can be stable only after several minutes. Referring to FIG. 2, the relation between the use time of fluorescent lamp and the brightness of the fluorescent lamp is shown. Obviously, the brightness of the fluorescent lamp will gradually decrease due to the aging situation of the lamp. It is to be noticed that the unstable condition of the light source will affect the scanning quality.

Figure 3:
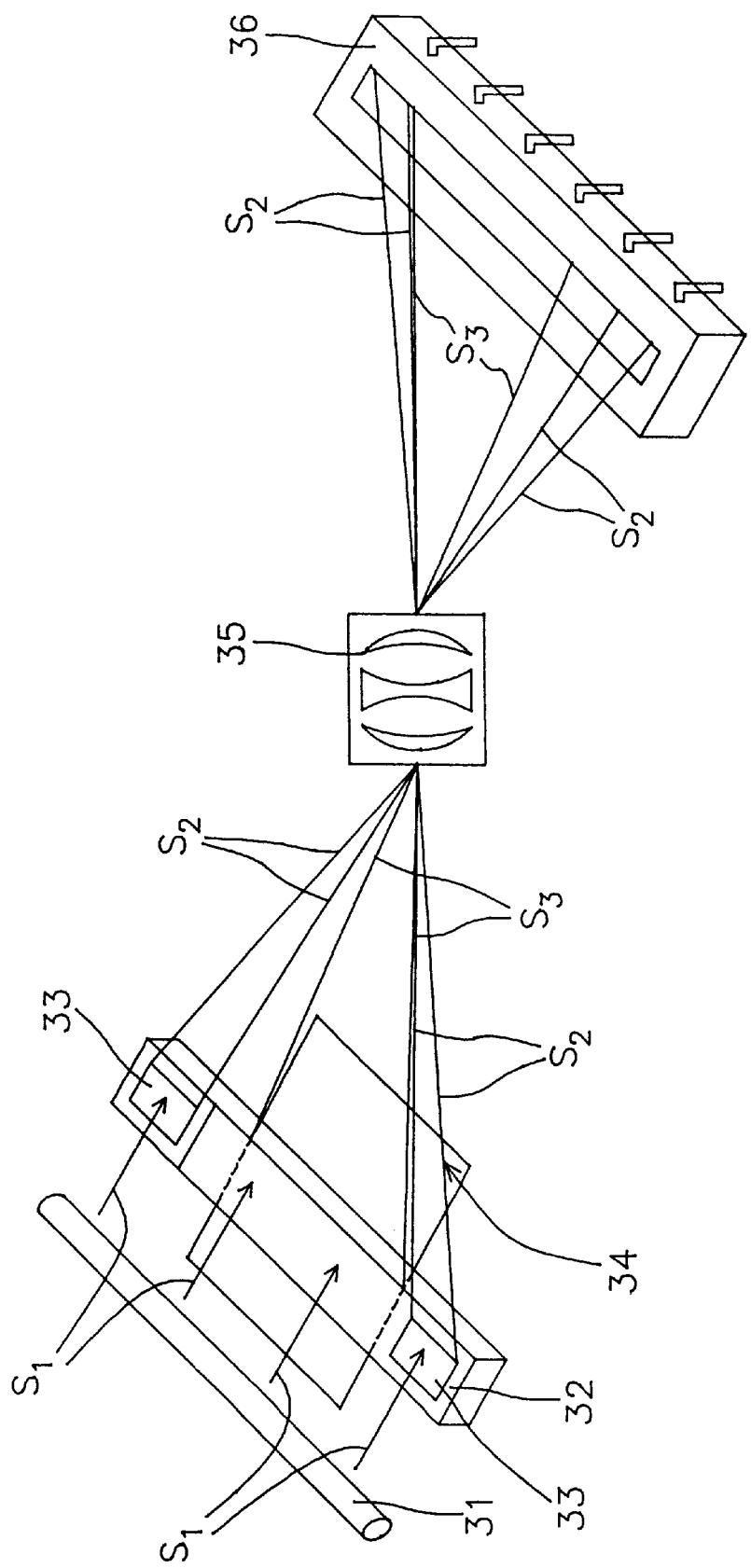
FIG. 3 schematically shows the pickup conditions of the brightness reflection signal and the reflecting signal of the object to be scanned according to the present invention.

FIG. 3 shows the pickup conditions of the object reflection signal and the brightness reflection signal according to the present invention. A light source 31, a bottom scanning window 32, a piece of paper 33, an object 34 to be scanned, a focusing reflector means 35, a linear image sensor 36, the light source signal S1, the brightness reflection signal S2, the object reflection signal S3 are all shown in FIG. 3.

The paper 22 is placed above the bottom window 32. In response to the light signal S1 from the light source 31, the brightness reflection signal S2 is obtained. The brightness reflection signal S2 passes through the focusing reflector means 35 and subsequently projects on the linear image sensor 36. In response to the light source signal S1 from the light source 31, the object reflection signal S3 of the scanned object 34 is obtained. The object reflection signal S3 passes through the focusing reflector means 35 and then projects on the linear image sensor 36.

Figure 4:
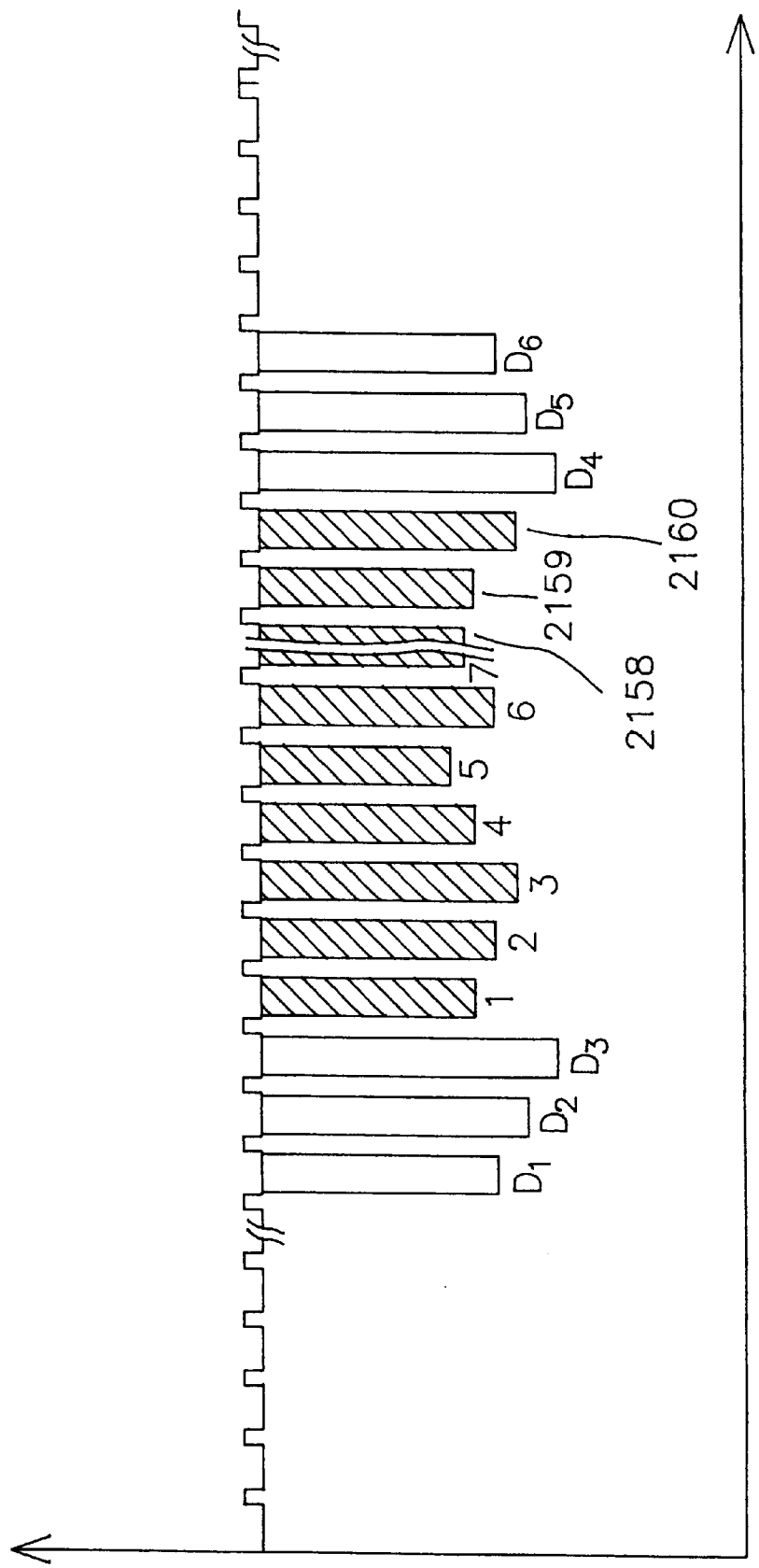
FIG. 4 shows the pulses of the image sense signal and the reference brightness signal according to the present invention.

FIG. 4 shows the pulses of the image sense signal and the reference brightness signal according to the present invention. The linear image sensor 36 in the image scanner includes plural pixels. Every pixel generates an amount of charge directly proportional to the intensity of the sensed light. By the pulses from the digital control circuit which is well-known in the art, the charge of every pixel is sequentially converted into serial voltage output. The number of the pixels of the linear image sensor 36 are usually selected to be larger than the number actually required. Therefore, in addition to the pixels for the scanned object 34, some pixels are used for the reference brightness signal. Taking FIG. 4 for example, the pulses indicated by the numerals 1~2160 are the scanned serial image sense signals and the pulses indicated by D1~D6 are the reference brightness signals according to the present invention.

Figure 5:
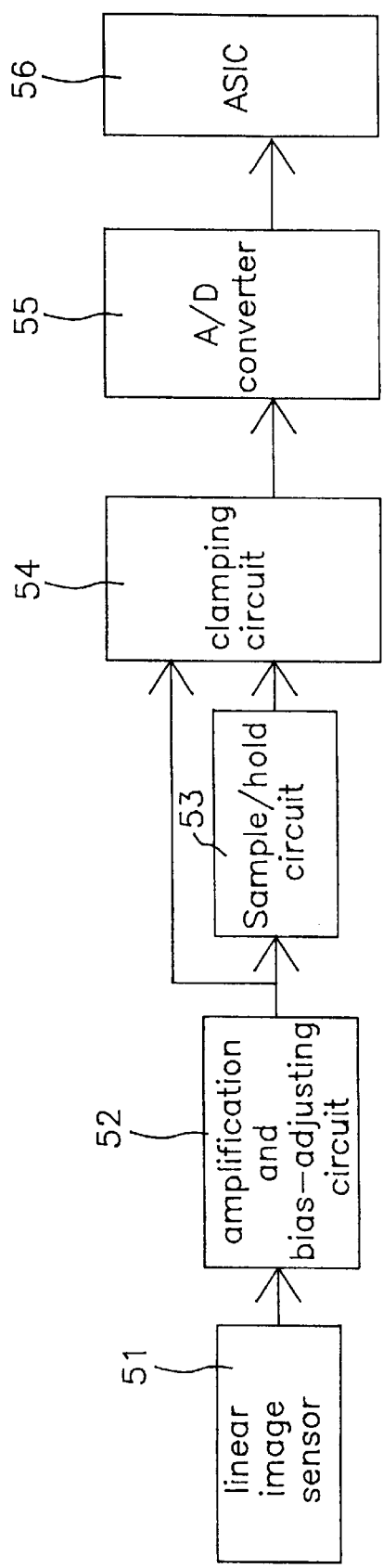
FIG. 5 shows the block diagram of the brightness-controlling device according to the present invention.

FIG. 5 shows the block diagram of brightness-controlling device according to one preferred embodiment of the present invention. The present brightness-controlling device includes a linear image sensor 51, an amplification and bias-adjusting circuit 52, a sample/hold circuit 53, a clamping circuit 54; an analog/digital converter (A/D converter) 55, and an ASIC (Application Specific Integrated Circuit) 56. After the linear image sensor 51 receives the brightness reflection signal S2 and the object reflection signal S3, the charges corresponding to the pixels are converted into the voltage serial output and transmitted into the amplification and bias-adjusting circuit to generate the proper image sense signal and the reference brightness signal. After processed by the sampling/hold circuit 53 and the clamping circuit 54, the image sense signal and the reference brightness signal are at the same level and then transmitted into the analog/digital converter 55. Finally, the digitized signals are transmitted into the ASIC 56 for compensating the image sense signal.

FIG. 6 is a diagram illustrating the color scale quality of the image sense signal and the reference brightness signal according to the present invention, which shows the above-mentioned compensation. When the white paper 33 is placed on the bottom window 32 of the scanner. The color scale quality can be set to 255. When the first optical line is scanned, the color scale quality of the reference brightness signal is 202, and the color scale quality of the image sense signal is 105, 153, . . . , 200, and the difference of the reference brightness signal color scale quality 202 and the predetermined color scale quality 255 is −53. The software will automatically add 53 to the color scale quality of the image sense signal. That is, the compensated color scale quality of the image sense signal is 158, 206, . . . , 253, and then the image sense signal is outputted. In the same way, all optical lines are compensated, and a satisfactory scanning quality is obtained. Since embodiments for implementing what is described here are readily conceivable by those skilled in the art, no further detail thereof will be described here.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

Therefore, the above description and illustration should not be taken as limiting the scope of the present invention which is defined by the appended claims.

What is claimed is:

1. An image scanning device adapted to be used in an image scanner having a light source and a focusing reflector means, the image scanning device comprising:

a brightness reflection device for generating a brightness reflection signal in response to a light signal from said light source;

an image sense device for respectively generating an image sense signal and a reference brightness signal in response to an object reflection signal reflected from an object to be scanned and said brightness reflection signal; and a brightness-controlling device electrically connected to said image sense device for converting said image sense signal and said reference brightness signal into digitized signals and then executing a first numerical operation between a color scale value of said digitized reference brightness signal and a predetermined color scale value to generate a compensating color scale value, and a second numerical operation between said compensating color scale value and a color scale value of said digitized image sense signal to compensate said digitized image sense signal.

2. A device as set forth in claim 1 wherein said brightness reflection device is located in an optical path of said light signal.

3. A device as set forth in claim 2 wherein said brightness reflection device is mounted on a bottom scanning window of the image scanning device.

4. A device as set forth in claim 1 wherein said brightness reflection device is made of a light reflective material.

5. A device as set forth in claim 1 wherein said brightness reflection device is a light reflective sticker.

6. A device as set forth in claim 5 wherein said light reflective sticker further comprises a piece of white paper.

7. A device as set forth in claim 1 wherein said image sense device is a linear image sensor.

8. A device as set forth in claim 1 wherein said brightness-controlling device comprises:

an amplification and bias-adjusting circuit electrically connected to said image sense device for amplifying and biasing said image sense signal and said reference brightness signal;

a sample/hold circuit electrically connected to said amplification and bias-adjusting circuit for receiving said amplified and biased image sense signal and reference brightness signal to sample said amplified and biased image sense signal and reference brightness signal and hold the DC level of said amplified and biased image sense signal and reference brightness signal at a sampled level in response to a clock signal;

a clamping circuit electrically connected to said sample/hold circuit and said amplification and bias adjusting circuit for maintaining said sampled image sense signal and reference brightness signal at a fixed level for a predetermined period of time; and an analog/digital converter electrically connected to said clamping circuit for converting said image sense signal and said reference brightness signal into said digitized signals.

9. A method for compensating an image sense signal obtained from an image scanner, comprising the steps of:
  (a) providing an object to be scanned and a brightness reflection device;
  (b) causing to be generated an image sense signal obtained from said object and a reference brightness signal obtained from said brightness reflection device in response to a light signal;
  (c) digitizing said image sense signal and said reference brightness signal;
  (d) comparing a color scale value of said digitized reference brightness signal with a predetermined color scale value to obtain a compensating color scale value for said digitized image sense signal; and
  (e) compensating said digitized image sense signal by numerically operating between said compensating color scale value and said color scale value of said digitized image sense signal.

10. A method as set forth in claim 9 wherein said compensating color scale value is a difference between said predetermined color scale value and said color scale value of said digitized reference brightness signal.

11. A method as set forth in claim 10 wherein in said step (e), said digitized image sense signal is compensated by adding said compensating color scale value to a color scale value of said digitized image sense signal.

12. A method as set forth in claim 9 wherein said predetermined color scale value represents a color scale quality of said brightness reflection signal.

13. A method as set forth in claim 12 wherein said brightness reflection device is a white paper and said predetermined color scale value is 255.

14. An image scanner for scanning a scanned object, comprising:
  a linear bottom scanning window for defining a scan line for said scanned object;
  a piece of brightness reflection device attached on said linear bottom scanning window;
  a light source for illuminating a light on said bottom scanning window to generate a scan line image signal including an image of said scan line of said scanned object and an image of said piece of said brightness reflection device;
  a linear image sensor for receiving said scan line image signal and respectively generating an image sense signal and a reference brightness reflection signal; and
  a brightness-controlling device electrically connected to said linear image sensor for converting said image sense signal and said reference brightness signal into digitized signals and then mathematically adjusting said digitized image sense signal according to said digitized reference brightness signal.

* * * * *